(12) United States Patent
Esbensen et al.

(10) Patent No.: US 12,055,126 B2
(45) Date of Patent: Aug. 6, 2024

(54) DETERMINATION OF WIND PARAMETER VALUES FOR USE IN WIND TURBINE CONTROL SYSTEMS

(71) Applicant: Siemens Gamesa Renewable Energy A/S, Brande (DK)

(72) Inventors: Thomas Esbensen, Herning (DK); Jared Frank, Longmont, CO (US); Kirk Pierce, Lafayette, CO (US)

(73) Assignee: Siemens Gamesa Renewable Energy A/S, Brande (DK)

( * ) Notice: Subject to any disclaimer, the term of this patent is extended or adjusted under 35 U.S.C. 154(b) by 143 days.

(21) Appl. No.: 17/617,968

(22) PCT Filed: Jun. 24, 2020

(86) PCT No.: PCT/EP2020/067649
§ 371 (c)(1),
(2) Date: Dec. 10, 2021

(87) PCT Pub. No.: WO2021/004788
PCT Pub. Date: Jan. 14, 2021

(65) Prior Publication Data
US 2022/0252051 A1 Aug. 11, 2022

(30) Foreign Application Priority Data
Jul. 5, 2019 (EP) .................................... 19184764

(51) Int. Cl.
*F03D 7/00* (2006.01)
*F03D 7/02* (2006.01)
*F03D 17/00* (2016.01)

(52) U.S. Cl.
CPC .............. *F03D 17/00* (2016.05); *F03D 7/00* (2013.01); *F03D 7/02* (2013.01); *F05B 2260/84* (2013.01);
(Continued)

(58) Field of Classification Search
CPC ... F03D 17/00; F03D 7/00; F03D 7/02; F05D 2260/84; F05D 2270/32; F05D 2270/321
See application file for complete search history.

(56) References Cited

U.S. PATENT DOCUMENTS 7,550,862 B2 * 6/2009 Altemark .............. F03D 7/0204
416/17
2010/0080703 A1 * 4/2010 Chen ....................... F03D 17/00
416/61
(Continued)

FOREIGN PATENT DOCUMENTS

DE 102016005159 A1 * 11/2017
EP 3 486 481 A1 5/2019
(Continued)

OTHER PUBLICATIONS

International Search Report & Written Opinion for PCT/EP2020/067649 issued on Oct. 7, 2020.

*Primary Examiner* — David E Sosnowski
*Assistant Examiner* — Theodore C Ribadeneyra
(74) *Attorney, Agent, or Firm* — Schmeiser, Olsen & Watts LLP

(57) ABSTRACT

Provided is a method of determining a wind parameter value for use in a wind turbine control system, the method including (a) receiving a plurality of wind measurement signals, wherein each wind measurement signal is provided by a respective wind sensor among a plurality of wind sensors, (b) determining a set of statistical values based on the wind measurement signals, (c) calculating a weighting factor for each wind measurement signal based on the set of statistical values, and (d) calculating the wind parameter value as a weighted sum by applying the calculated weighting factors to the corresponding wind measurement signals. Further, a corresponding system and a wind turbine with such a system are provided.

10 Claims, 1 Drawing Sheet

Figure 1:
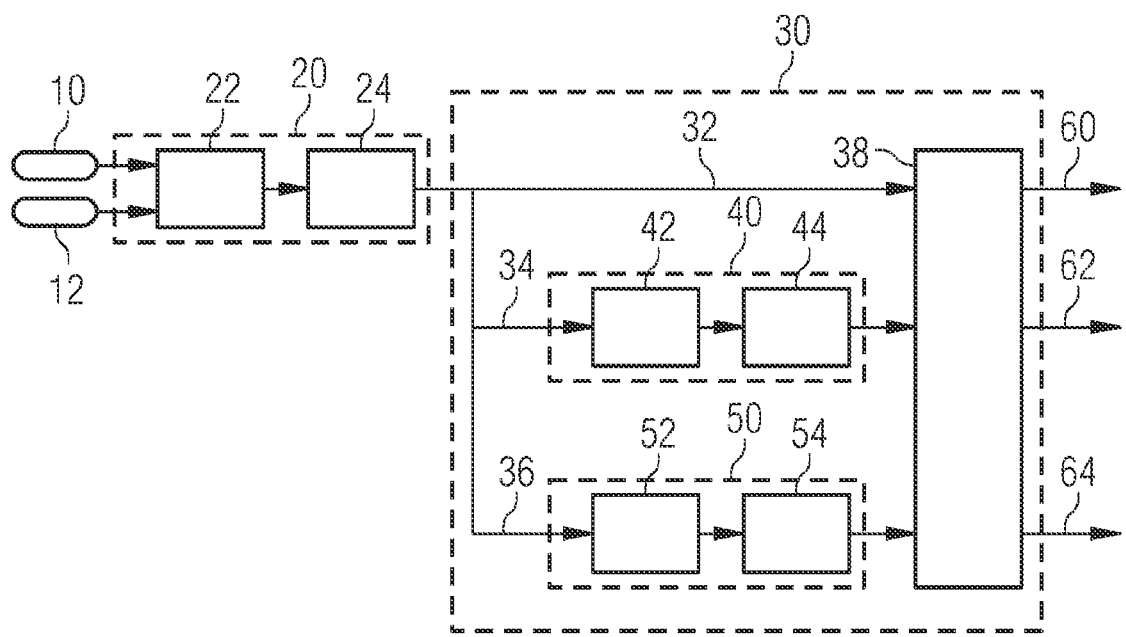

(52) U.S. Cl.
    CPC ..... *F05B 2270/32* (2013.01); *F05B 2270/321* (2013.01)

(56) References Cited

U.S. PATENT DOCUMENTS

| | | | |
|---|---|---|---|
| 2016/0076517 A1* | 3/2016 | Butterworth | ............ F03D 7/044 |
| | | | 700/275 |
| 2016/0298607 A1 | 10/2016 | Gregg et al. | |
| 2017/0268484 A1* | 9/2017 | Li | ........................ G01B 21/22 |
| 2018/0363625 A1 | 12/2018 | Nielsen | |
| 2020/0182225 A1* | 6/2020 | Nielsen | .................. F03D 17/00 |

FOREIGN PATENT DOCUMENTS

| | | | | |
|---|---|---|---|---|
| WO | WO-2012089214 A2 * | 7/2012 | ............. | F03D 17/00 |
| WO | 2019/007579 A1 | 1/2019 | | |

* cited by examiner

DETERMINATION OF WIND PARAMETER VALUES FOR USE IN WIND TURBINE CONTROL SYSTEMS

CROSS-REFERENCE TO RELATED APPLICATIONS

This application claims priority to PCT Application No. PCT/EP2020/067649, having a filing date of Jun. 24, 2020, which claims priority to EP Application No. 19184764.9, having a filing date of Jul. 5, 2019, the entire contents both of which are hereby incorporated by reference.

FIELD OF TECHNOLOGY

The following relates to the field of wind turbines, in particular to methods and systems for determining wind parameter values for use in a wind turbine control system. The following further relates to a wind turbine utilizing such methods and systems.

BACKGROUND

Wind parameter values, in particular wind speed and wind direction, are important data for the control of modern wind turbines. To prevent malfunction, it is known to equip a wind turbine with redundant wind sensors such that another sensor can be used in place of a defective sensor. This approach suffers from several drawbacks.

When two or more redundant sensors for measuring wind speed and/or wind direction are installed on a wind turbine, various types of disturbances can cause the wind speed and wind direction measurements from one sensor to be significantly less reliable than the measurements from the other sensor(s). For example, when wind sensors located close to a nacelle component, e.g., a cooling tower, become situated in the lee of the component, their measurements can be corrupted by large disturbances that do not affect the other sensor(s). Moreover, everything from normal wear and tear of hardware to external environmental disturbances (e.g., large wind gusts, heavy precipitation, etc.) may cause the measurements from one sensor to become significantly faulty compared to the measurements from the other sensor(s). These conditions may have either a temporary or permanent impact on the difference in quality between the measurements from each of the redundant sensors, which may or may not suggest a need to repair or replace the less reliable sensor. However, the use of the measurements from the faulty sensor could cause the turbine to respond abnormally, leading to undesirable conditions in which the turbine experiences high loads, reduced power production, excessive yawing, or unnecessary downtime.

Several different solutions are currently considered to address the challenges described above. For example, to mitigate disturbances caused by obstacles near the nacelle-mounted wind sensors, the first response is usually to relocate the sensors, often on top of the nacelle component, such that they no longer become obstructed by the component. However, relocation may not always be possible due to conflicting requirements, e.g., safety and accessibility. Moreover, relocation may necessitate significant re-development or re-tuning of existing software, namely calibration algorithms whose parameters can be sensitive to the placement of the sensors.

Another approach has been for manufacturers to seek entirely alternative wind measurement solutions to conventional nacelle-mounted sensors, such as spinner-mounted sensors and lidar sensors, that prevent disturbances caused by placement near nacelle components or behind the turbine rotor. However, these wind measurement solutions can be significantly more expensive and/or can require significant effort in terms of both hardware and software development, which can deter manufacturers from investigating them.

A simpler and less expensive approach has been to design algorithms that detect faults with the sensors and to switch from a sensor that is detected as faulty to a sensor that appears to be providing more reliable measurements.

Thus, there may be a need for an improved and more effective utilization of redundant wind sensors in order to provide robust and reliable wind information to the wind turbine control system.

SUMMARY

An aspect relates to a method of determining a wind parameter value for use in a wind turbine control system, the method comprising (a) receiving a plurality of wind measurement signals, wherein each wind measurement signal is provided by a respective wind sensor among a plurality of wind sensors, (b) determining a set of statistical values based on the wind measurement signals, (c) calculating a weighting factor for each wind measurement signal based on the set of statistical values, and (d) calculating the wind parameter value as a weighted sum by applying the calculated weighting factors to the corresponding wind measurement signals.

This aspect of embodiments of the invention are based on the idea that the information included in several wind measurement signals received from a plurality of wind sensors is fused or combined by calculating a weighted sum of the signals. The weights applied to the signals are calculated on the basis of statistical values determined for the wind measurement signals. Thereby, the use of as much available information as possible is optimized.

According to an embodiment of the invention, the method further comprises determining a status of each wind sensor based on the set of statistical values.

In other words, the statistical values are used to determine an individual status of each wind sensor. The status information can be useful both during maintenance work and during normal operation. In the latter case, the status information may e.g., be used in the calculation of weighting factors.

According to a further embodiment of the invention, the status indicates one or more of a properly working wind sensor, a defective wind sensor, a partially blocked sensor, and a completely blocked sensor.

According to a further embodiment of the invention, determining the status of each wind sensor comprises determining whether a predetermined condition has been met for a predetermined period of time.

Requiring a condition to be met for a predetermined period of time prevents rapid status changes in response to sudden events or single signal outliers. For example, it may be required that a Boolean variable indicating a certain status has the same value for the entire predetermined period of time. Alternatively, it may be required that the Boolean variable has a value indicating the status for a fraction of the predetermined period of time. Both the predetermined period of time and the fraction may be set individually for each possible status. Thereby, some statuses may require fewer and/or shorter indications than others.

According to a further embodiment of the invention, calculating the weighting factor for each wind measurement signal is further based on the status of the corresponding wind sensor. By taking the status of the corresponding wind sensor into consideration when calculating the individual weighting factors, the reliability may be further enhanced. For example, a certain sensor signal may be assigned a non-zero weighting factor based on the statistical values alone. However, if the status of the corresponding sensor changes to "defective" or "completely blocked", this information can advantageously be used to immediately reduce the corresponding weighting factor to zero.

According to a further embodiment of the invention, the wind parameter value comprises at least one of a wind speed value and a wind direction value.

According to a further embodiment of the invention, the set of statistical values comprises at least one of a wind speed mean value, a wind speed variance and a wind direction variance corresponding to each wind sensor.

Some wind sensors are capable of providing both wind speed and wind direction values while other wind sensors may only provide one of these values. It is accordingly to be understood, that only those statistical values corresponding to the actual sensor's capability apply to the sensor.

According to a further embodiment of the invention, receiving the plurality of wind measurement signals comprises validating the wind measurement signals.

By validating the wind measurement signals before further processing them, signals without useful contents (e.g., in case of hardware failures, signal dropouts, etc.) can be ruled out in advance such that they do not influence the statistical processing.

According to a further embodiment of the invention, the method further comprises (a) determining a wind estimate signal based on a mathematical model and one or more measured operational parameter values, and (b) utilizing the wind estimate signal as a further wind measurement signal.

The measured operational parameter values may in particular be rotor speed, power production (active and/or reactive output power), pitch angle, and similar parameter values relating to the operation of a wind turbine.

The mathematical model provides a wind estimate signal based on the measured operational parameter values.

By using the wind estimate signal as an additional wind measurement signal, a further source of valuable information is included in the calculations.

According to a second aspect of embodiments of the invention, there is provided a system for determining a wind parameter value for use in a wind turbine control system, the system comprising (a) a plurality of wind sensors, and (b) a processing device configured to: (c) receive a plurality of wind measurement signals, wherein each wind measurement signal is provided by a respective wind sensor among the plurality of wind sensors, (d) determine a set of statistical values based on the wind measurement signals, (e) calculate a weighting factor for each wind measurement signal based on the set of statistical values, and (f) calculate the wind parameter value as a weighted sum by applying the calculated weighting factors to the corresponding wind measurement signals.

This aspect of embodiments of the invention is essentially based on the same idea as the first aspect discussed above.

According to a third aspect of embodiments of the invention, there is provided a wind turbine comprising a system according to the second aspect described above.

According to a further embodiment of the invention, the wind sensors are arranged at different locations on an upper part of a nacelle of the wind turbine.

By distributing the wind sensors in a rational manner across the upper part of the nacelle, it can be assured that useful wind speed information can be obtained by a majority of the sensors in most situations.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Figure 2:
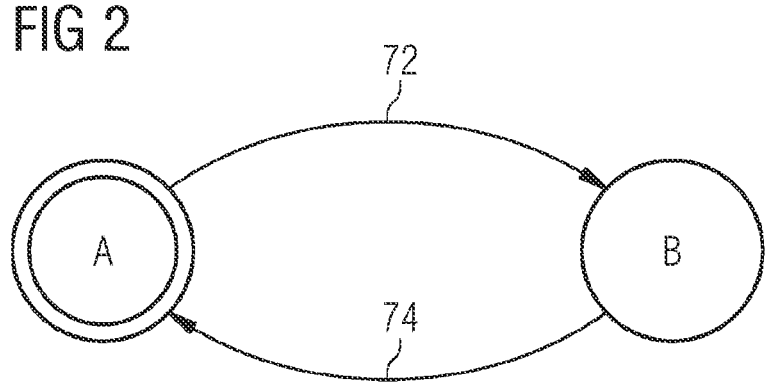

Some of the embodiments will be described in detail, with reference to the following figures, wherein like designations denote like members, wherein:

FIG. 1 shows a block diagram of a system according to an exemplary embodiment; and FIG. 2 shows a state diagram relating to wind sensor status as used in exemplary embodiments.

DETAILED DESCRIPTION

FIG. 1 shows a block diagram of a system according to an exemplary embodiment. The block diagram of FIG. 1 is an implementation of a method according to embodiments of the present invention.

More specifically, the system comprises a first or primary source of measurements 10 and a second or secondary source of measurements 12. The first source of measurements 10 may be a plurality of wind (speed and/or direction) sensors arranged at various positions on top of a wind turbine nacelle. The second source of measurements 12 may be a wind estimator using a mathematical model and operational parameter values of the wind turbine, such as rotor speed, output power, pitch angle, etc. to provide estimated wind speed and/or direction values. The outputs from 10 and 12 (in the following referred to as wind measurement signals) are provided to a validation unit 20 comprising a hardware failure detecting unit 22 and a signal dropout detecting unit 24. The output from the validation unit consists of all valid wind measurement signals and is provided as an input to main processing unit 30.

The main processing unit 30 shown in FIG. 1 is designed to handle three different cases, namely the case where no valid sensor signal is received, the case where a single valid sensor signal is received, and the case where multiple valid sensor signals are received. In the first case (i.e., no valid sensor signal), a corresponding signal 32 is supplied to decision unit 38. In the second case (i.e., a single valid sensor signal), the corresponding signal 36 is supplied to a first detector unit 50 which comprises a first statistic unit 52 and a first status determining unit 54. In the third case (i.e., several valid sensor signals), the corresponding signals are supplied to a second detector unit 40 which comprises a second statistic unit 42 and a second status determining unit 44. In the two latter cases, corresponding resulting output signals are supplied from the first/second detector unit 50/40 to the decision unit 38 for processing. In the cases of no or only one valid sensor signal, the processing is simple and merely consists in outputting an error message or a wind parameter value corresponding to the single valid measurement value.

In case of two or more valid sensor signals, the second statistic unit 42 determines a set of statistical values, such as mean wind speed, wind speed variance, and a wind direction variance, for each signal and compares the statistical values with each other to determine a status of each sensor (such as "properly working sensor", "defective wind sensor", "partially blocked sensor" or "completely blocked sensor") in the second state determining unit 44. The results of the statistical value comparison and of the status determination is output to the decision unit 38 which combines the information to generate and output a status signal 60, a wind parameter value signal 62, and a quality and source signal 64. The status signal 60 indicates a status of each sensor, the wind parameter value signal 62 indicates a wind speed and/or wind direction value, and the quality and source signal 64 indicates an estimated quality of the wind parameter value signal 62 as well as the sensors used to obtain it.

FIG. 2 shows a state diagram relating to wind sensor status determination in the status determining units 44, 54 as used in exemplary embodiments. The state diagram shows two states A and B for a selected sensor. State A may e.g., be "properly working sensor" and state B may e.g., be "blocked sensor". Assume that the selected sensor is currently in state A and that several valid sensor signals are available. The second state determining unit 44 continuously checks whether a condition for changing to state B is valid, e.g., whether the mean wind speed measured by the selected sensor is significantly lower than the mean wind speed measured by the other sensors. The result of each check is a Boolean value, i.e., TRUE or FALSE. If the Boolean value is TRUE for a predetermined period of time (e.g., 100 ms) or at least during a predetermined fraction of the predetermined period of time (e.g., the Boolean value is TRUE for at least a total of 75 ms within the last 100 ms), then the state changes to B as indicated by arrow 72. Thereafter, a condition for switching back to state A is continuously checked in a similar manner. Once the condition is fulfilled (e.g., when the mean wind speed value is within a predetermined range of the mean speed value of the other sensors for another predetermined period of time), the state switches back to A.

As discussed above, embodiments of the present invention combine the wind speed and wind direction measurements provided by each of the wind sensors in order to provide the most accurate and robust measured values for these quantities at all times. To perform this fusion, the algorithm monitors over time the statistics of the measurements from each valid wind sensor in order to detect faults in one or more sensors. When more than one wind sensor is valid (i.e., not experiencing major hardware/communication failures that prevent the sensor measurements from being available), the statistics of the sensor measurements (i.e., their means and standard deviations) are compared to each other by the second detector unit 40. Weights and statuses are assigned to the sensors based on the magnitude and direction of the relative differences between their statistics. For example, when a sensor mounted at one location on the nacelle provides wind speed and/or direction measurements that appear noisier than those from a sensor mounted at another location, the relative difference in the standard deviations between the corresponding measurements increases, and the sensor with lower standard deviation measurements is progressively weighed higher than the sensor with higher standard deviation measurements. Similarly, when a sensor provides wind speed measurements that appear lower than those from another sensor, the relative difference in the means between the wind speed measurements increases, and the sensor with higher wind speed mean is weighed higher than the sensor with lower wind speed mean.

While the weights assigned to the sensors dictate the contribution that each sensor has in the fusion of their measurements, the assigned statuses alert other functionality on the turbine of the quality of each sensor's measurements and the resulting fused measurements. As a result, the fused measurements do not contain much of the undesirable noise/disturbances that appear in the measurements from only one of the sensors. Moreover, the geometry of the sensor installations relative to a potentially obstructive nacelle component is considered when detecting faults with the sensors. For example, when a sensor is weighed significantly lower than the other sensor(s) due to producing lower quality measurements, and recent wind direction measurements suggest that sensor is in the lee of a nacelle component, it is inferred that the sensor is blocked by the component.

When only one wind sensor is valid, that sensor's measurements are used directly as the fused measurements. Since the statistics from another sensor's measurements are not available for comparison, the statistics of the valid sensor's measurements are compared instead to logically-or empirically-derived limits on the values of the statistics to detect faults and infer blocking by a nacelle component when these limits are crossed, using the first detector unit 50. Because blocking by a nacelle component can cause large disturbances in the sensor measurements that can occur due to other causes, such as sensitivity of ultrasonic sensors to low wind speed, the order in which particular behaviors in the measurements occur (e.g., changes in wind direction, drops in wind speed, onset of high variance wind measurements) must be monitored to minimize false positive as well as false negative detections of faults.

To ensure robust detections of particular behaviors in the wind measurements, a filtering is applied to the Boolean (i.e., binary) variables that indicate whether a particular condition is present. This is also discussed above in conjunction with FIG. 2. Referred to as the Average-based Binary Filter, this filter computes the moving average of 1's and 0's contained in the Boolean input over a certain time window, TimeDetect, and compares it to a prescribed decimal value, PercentDetect/100%. Using the filter, which provides a kind of hysteresis-based filtering of the Boolean input, the onset of a behavior can be detected if the corresponding condition has been present (the Boolean input has been equal to 1) for more than a percentage, PercentDetect, of the set time window, TimeDetect. Similarly, the recovery from the condition (i.e., the end of the behavior) can be determined using an independently set percentage and time window as for the onset. FIG. 2 shows a conceptual overview of the Average-based Binary Filter.

Note that embodiments of the invention may be extended to the situation where there are two or more locations where sensors are mounted, but one location may hold a wind speed sensor (i.e., anemometer) and a wind direction sensor (i.e., wind vane), or a sensor measuring both quantities. It would be likely that if one sensor at a particular location is blocked by a nacelle component, the other sensor is blocked as well. This logic can be exploited in embodiments of the invention, when the failure case is particularly blocking by a nacelle component. However, the statistics of each sensor at a particular mounting location must still be monitored independently to detect cases in which one sensor experiences a failure that does not affect the other sensor.

Embodiments of the invention allow for the most reliable wind speed and/or wind direction measurements to be provided from two or more redundant wind sensors installed on the nacelle.

When conditions are present that negatively impact the measurements from only one of the sensors, embodiments of the invention allow the faulty measurements that result to be ignored by using the superior measurements provided by the unaffected sensor. Significant disturbances experienced by one sensor (e.g., when the sensor is in the lee of a nacelle component) that would impact turbine control are ignored. As a result, embodiments of the invention have the advantages of reduced yaw misalignment and reduced downtime, which lead to reduced operational loads (improving lifetime) and improved annual energy production, without the need to optimize the locations for the sensors to be installed or to invest in alternative technologies for anemometry. Moreover, by monitoring and fusing the measurements from all valid sensors at all times, embodiments of the invention utilize available hardware resources more efficiently than solutions that simply activate one sensor or another.

The ability to compare and weigh the sensors on a continuous basis when multiple measurements are valid allows embodiments of the invention to make the most informed detections of faults occurring on one or more sensors and to provide the most accurate and robust fused wind speed and wind direction measurements at all times. Specifically, the detector 40 leverages the relative differences in three statistics between the two or more sensors: wind speed mean, wind speed variance, and wind direction variance, and weighs the sensors such that the sensor measurements with higher wind speed mean, lower wind speed variance, and lower wind direction variance is preferred over the other sensor(s).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a wind parameter value for use in a wind turbine control system, the method comprising:
   receiving a plurality of wind measurement signals, wherein each wind measurement signal is provided by a respective wind sensor among a plurality of wind sensors;
   determining a set of statistical values based on the wind measurement signals;
   calculating a weighting factor for each wind measurement signal based on the set of statistical values, wherein the calculating the weighting factor includes comparing statistical values of the plurality of sensors with each other to determine a status of the plurality of wind sensors and to determine relative differences between the statistical values of the plurality of sensors, and the weighting factor is based on the status and the relative differences; and
   calculating the wind parameter value as a weighted sum by applying the calculated weighting factors to the corresponding wind measurement signals.

2. The method according to claim 1, wherein the status indicates one or more of a properly working wind sensor, a defective wind sensor, a partially blocked sensor, and a completely blocked sensor.

3. The method according to claim 1, wherein the status of each wind sensor is further determined by determining whether a predetermined condition has been met for a predetermined period of time.

4. The method according to claim 1, wherein the wind parameter value comprises at least one of a wind speed value and a wind direction value.

5. The method according to claim 1, wherein the set of statistical values comprises at least one of a wind speed mean value, a wind speed variance and a wind direction variance corresponding to each wind sensor.

6. The method according to claim 1, wherein receiving the plurality of wind measurement signals comprises validating the wind measurement signals.

7. The method according to claim 1, further comprising:
   determining a wind estimate signal based on a mathematical model and one or more measured operational parameter values, and
   utilizing the wind estimate signal as a further wind measurement signal.

8. A system for determining a wind parameter value for use in a wind turbine control system, the system comprising:
   a plurality of wind sensors, and
   a processing device configured to:
   receive a plurality of wind measurement signals, wherein each wind measurement signal is provided by a respective wind sensor among the plurality of wind sensors;
   determine a set of statistical values based on the wind measurement signals;
   calculate a weighting factor for each wind measurement signal based on the set of statistical values, wherein the weighting factor is calculated by comparing statistical values of the plurality of sensors with each other to determine a status of the plurality of wind sensors and to determine relative differences between the statistical values of the plurality of sensors, and the weighting factor is based on the status and the relative differences; and
   calculate the wind parameter value as a weighted sum by applying the calculated weighting factors to the corresponding wind measurement signals.

9. A wind turbine comprising a system according to claim 8.

10. The wind turbine according to claim 9, wherein the wind sensors are arranged at different locations on an upper part of a nacelle of the wind turbine.

* * * * *